(12) United States Patent
Lee et al.

(10) Patent No.: US 7,796,546 B2
(45) Date of Patent: Sep. 14, 2010

(54) APPARATUS AND METHOD FOR SUPPORTING MULTIPLE LINKS IN A NETWORK USING FREQUENCY BANDS

(75) Inventors: Mi-Hyun Lee, Seoul (KR); Pan-Yuh Joo, Seoul (KR); Jung-Je Son, Seongnam-si (KR); Jae-Weon Cho, Suwon-si (KR); Hyoung-Kyu Lim, Seoul (KR); Yeong-Moon Son, Anyang-si (KR); Sung-Jin Lee, Seoul (KR); Hyun-Jeong Kang, Seoul (KR); Song-Nam Hong, Seoul (KR); Young-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 722 days.

(21) Appl. No.: 11/582,934

(22) Filed: Oct. 17, 2006

(65) Prior Publication Data
US 2007/0086368 A1   Apr. 19, 2007

(30) Foreign Application Priority Data
Oct. 18, 2005 (KR) .................. 10-2005-0097849

(51) Int. Cl.
*H04B 7/14* (2006.01)
(52) U.S. Cl. .................. 370/315; 370/330; 370/478; 455/7; 455/450
(58) Field of Classification Search .................. 370/313, 370/345, 328, 302, 314, 315, 322, 326, 329, 370/330, 341, 343, 348, 431, 443, 458, 464, 370/478, 320, 246, 293, 319, 321; 455/7, 455/17, 20, 21, 23, 42, 73, 130, 205, 450, 455/464, 509, 179.1, 9, 11
See application file for complete search history.

(56) References Cited

U.S. PATENT DOCUMENTS

| | | | | |
|---|---|---|---|---|
| 5,241,686 A * | 8/1993 | Charbonnier | ................ | 455/453 |
| 5,509,028 A * | 4/1996 | Marque-Pucheu | .......... | 375/211 |
| 5,550,992 A * | 8/1996 | Hashimoto | .................. | 370/337 |
| 6,002,672 A * | 12/1999 | Todd | .......................... | 370/252 |
| 6,516,184 B1 * | 2/2003 | Damgaard et al. | ............ | 455/86 |
| 6,839,539 B2 * | 1/2005 | Durrant et al. | ............. | 455/11.1 |

(Continued)

FOREIGN PATENT DOCUMENTS

| | | |
|---|---|---|
| JP | 2002-252587 | 9/2002 |
| KR | 100144208 | 4/1998 |
| KR | 1020050101890 | 10/2005 |
| WO | WO 2005/067173 | 7/2005 |

OTHER PUBLICATIONS

Fong et al., On the Scalability of Fixed Broadband Wireless Access Network Deployment, Sep. 2004, IEEE Radio Communications Magazine, pp. 512-518 http://ieeexplore.ieee.org/stamp/stamp.jsp?arnumber=01336719.*

*Primary Examiner*—Kamran Afshar
*Assistant Examiner*—Marisol Fahnert
(74) *Attorney, Agent, or Firm*—The Farrell Law Firm, LLP

(57) ABSTRACT

An apparatus and a method for supporting multiple links in a multi-hop relay cellular network using at least two frequency bands are provided. A subframe for a link on which a Mobile Station (MS) or a Relay Station (RS) communicates with a Base Station (BS) is configured in a first frequency band, and a subframe for a link on which the BS or the RS communicates with the MS is configured in a second frequency band.

12 Claims, 15 Drawing Sheets

U.S. PATENT DOCUMENTS

| | | | |
|---|---|---|---|
| 7,167,722 B2* | 1/2007 | Chiu et al. | 455/553.1 |
| 2003/0008654 A9* | 1/2003 | Senarath et al. | 455/450 |
| 2003/0125067 A1* | 7/2003 | Takeda et al. | 455/522 |
| 2004/0095907 A1* | 5/2004 | Agee et al. | 370/334 |

* cited by examiner

APPARATUS AND METHOD FOR SUPPORTING MULTIPLE LINKS IN A NETWORK USING FREQUENCY BANDS

This application claims priority under 35 U.S.C. §119 to an application filed in the Korean Intellectual Property Office on Oct. 18, 2005 and assigned Ser. No. 2005-97849, the contents of which are incorporated herein by reference.

BACKGROUND OF THE INVENTION

1. Field of the Invention

The present invention relates generally to a multi-hop relay cellular network, and in particular, to a frame configuration method and apparatus for supporting multiple links in a multi-hop relay cellular network using two frequency bands.

2. Description of the Related Art

Today, many people carry lots of digital electronic devices such as laptop computers, handheld phones, Personal Digital Assistants (PDAs), Moving Picture Experts Group (MPEG) Audio Layer 3s (MP3s), etc. Most of them run independently without interworking. If the portable digital electronic devices may form a wireless network without the aid of a central control system, the individual devices can share a variety of pieces of information easily with one another and thus can provide unprecedented and diverse information services. Such a wireless network enabling communications among the devices without the aid of the central control system irrespective of time and place is called an ad hoc network or a ubiquitous network.

One critical requirement for deployment of a $4^{th}$ Generation (4G) mobile communication system under recent active research is to build a self-configurable wireless network.

A self-configurable wireless network is a wireless network that is configured in an autonomous or distributed manner without control of a central system to provide mobile communication services. A 4G mobile communication system installs cells of very small radiuses for the purpose of enabling high-speed communications and accommodating a larger number of calls. A conventional centralized wireless network design is not feasible for a self-configurable wireless network. Rather, such a wireless network should be built to be under distributed control and to actively cope with an environmental change like an addition of a new Base Station (BS). That's why a 4G mobile communication system uses a self-configurable wireless network configuration.

For real deployment of a self-configurable wireless network, techniques used for an ad hoc network should be introduced to a mobile communication system. A major example of them is a multi-hop relay cellular network built by applying a multi-hop relay scheme used for the ad hoc network to a cellular network with fixed BSs.

In general, since a BS and a Mobile Station (MS) communicate with each other via a direct link in the cellular network, a highly reliable radio link can be established easily between them.

However, due to the fixedness of the BSs, the configuration of the wireless network is not flexible, making it difficult to provide an efficient service in a radio environment experiencing a fluctuating traffic distribution and a great change in the number of calls.

These drawbacks can be overcome by a relay scheme of delivering data over multiple hops using a plurality of neighbor MSs or neighbor Relay Stations (RSs). A multi-hop relay scheme facilitates fast network reconfiguration adaptive to an environmental change and renders an overall wireless network operation efficient. Also, a radio channel in a better channel status can be provided to an MS by installing an RS between the BS and the MS and thus establishing a multi-hop relay path via the RS. What is better, since high-speed data channels can be provided to MSs in a shadowing area or an area where communications with the BS is unavailable, cell coverage is expanded.

FIG. 1 shows a typical multi-hop relay cellular network. An MS 110 within the service area 101 of a BS 100 is connected to the BS 100 via a direct link. On the other hand, an MS 120, which is located outside the service area 101 of the BS 100 and thus in a poor channel state, communicates with the BS 100 via a relay link of an RS 130.

The RS 130 provides better-quality radio channels to the MSs 110 and 120 when they communicate with the BS 100 but in a bad channel state as they are located at a boundary of the service area 101. Thus, the BS 100 can provide a high-speed data channel to the cell boundary area using a multi-hop relay scheme and thus expand its cell coverage. As shown in FIG. 1, there are a BS-RS link and an RS-MS link as well as a BS-MS link when a relay service is used in the cellular network.

To enable the MS to communicate with the RS as well as with the BS under circumstances in the multi-hop relay network, resources of the air interface must be dynamically distributed between the BS and the RS.

One or more frequency bands can be allocated to a service provider in the cellular network. Therefore, there exists a need for a communication mechanism for efficiently using the radio interface resources on multiple links using one or more frequency bands in the multi-hop relay cellular network.

SUMMARY OF THE INVENTION

An object of the present invention is to substantially solve at least the above problems and/or disadvantages and to provide at least the advantages below. Accordingly, an object of the present invention is to provide an apparatus and method for supporting a relay service using two frequency bands in a multi-hop relay cellular network.

Another object of the present invention is to provide a subframe configuration method and apparatus for supporting multiple links without intra-cell interference by use of two frequency bands in a multi-hop relay cellular network.

The above objects are achieved by providing an apparatus and method for supporting multiple links in a multi-hop relay cellular network using at least two frequency bands.

According to one aspect of the present invention, in a subframe configuration method for supporting multiple links in a multi-hop relay cellular network using at least two frequency bands, a subframe for a BS-RS link is configured in a first frequency band, and a subframe for at least one of a BS-MS link and an RS-MS link is configured in a second frequency band.

According to another aspect of the present invention, in a subframe configuration method for supporting multiple links in a multi-hop relay cellular network using at least two frequency bands, a subframe for a direct link service is configured in a first frequency band, and a subframe for a relay link service is configured in a second frequency band.

According to a further aspect of the present invention, in a subframe configuration method for supporting multiple links in a multi-hop relay cellular network using at least two frequency bands, a subframe for an RS-MS link is configured in a first frequency band, and a subframe for at least one of a BS-RS link and a BS-MS link is configured in a second frequency band.

According to still another aspect of the present invention, in a subframe configuration method for supporting multiple links in a multi-hop relay cellular network using at least two frequency bands, a subframe for a link on which an MS or an RS communicates with a BS is configured in a first frequency band, and a subframe for a link on which the BS or the RS communicates with the MS is configured in a second frequency band.

According to still a further aspect of the present invention, in a subframe configuration method for supporting multiple links in a multi-hop relay cellular network using at least two frequency bands, a subframe for a link on which an MS or an RS communicates with a BS is configured in a first frequency band, and a subframe for a link on which the BS or the MS communicates with the RS is configured in a second frequency band.

According to yet another aspect of the present invention, in a subframe configuration method for supporting multiple links in a multi-hop relay cellular network using at least two frequency bands, a subframe for a link on which a BS or an RS communicates with an MS is configured in a first frequency band, and a subframe for a link on which the BS or the MS communicates with the RS is configured in a second frequency band.

According to yet a further aspect of the present invention, in a frame configuration apparatus for supporting multiple links in a multi-hop relay cellular network using at least two frequency bands, an RF duplexer separates transmission and received signals according to the frequency bands of the signals. A timing controller provides transmission and reception timing signals for subframes in the frequency bands according to a frame configuration method. A transceiver transmits and receives signals according to the frequency bands of the signals in response to the timing signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
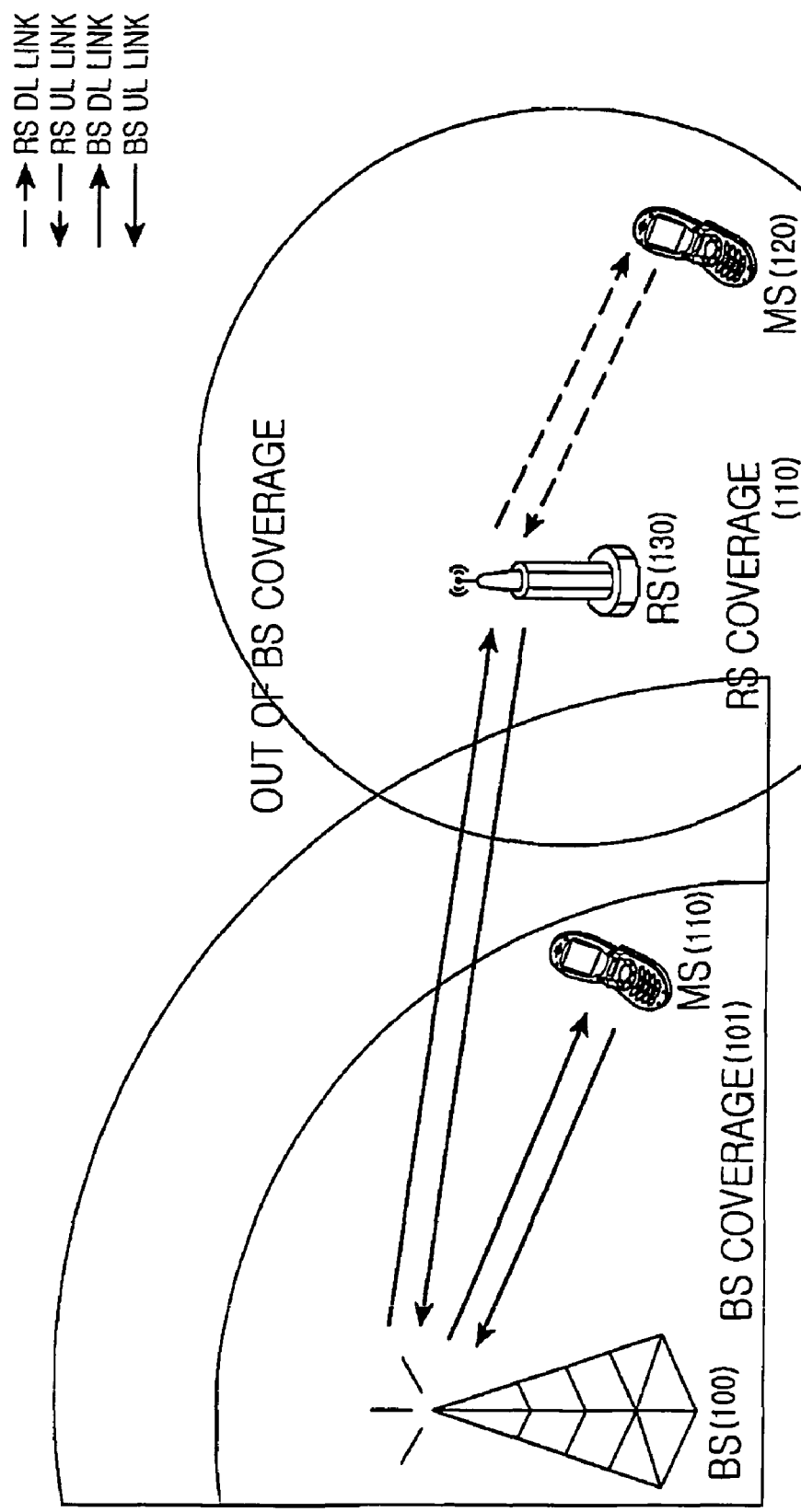
FIG. 1 illustrates a configuration of a typical multi-hop relay cellular network.

Preferred embodiments of the present invention will be described herein below with reference to the accompanying drawings. In the following description, well-known functions or constructions are not described in detail since they would obscure the invention in unnecessary detail.

The present invention provides a technique for configuring different links in two frequency bands in a multi-hop relay cellular network. Subframes are configured by allocating different links to the two frequency bands. The two frequency bands are referred to as a B1 band and a B2 band, respectively.

While the present invention is described in the context of a Time Division Duplex-Orthogonal Frequency Division Multiplexing (TDD-OFDM) wireless communication, it is to be appreciated that the present invention is also applicable to any other multiple access scheme. A link between a Base Station (BS) and a Relay Station (RS) is called a BS-RS link, a link between the BS and a Mobile Station (MS) is called a BS-MS link, and a link between the RS and the MS is called an RS-MS link. Subframes for the links are configured in one frame. Also, subframes for the links are configured in superframe.

In subframes shown in the drawings, the horizontal axis represents time and the vertical axis represents frequency. Information about areas in which the subframes are formed may be sent by control information about the frame. Every RS or MS receiving the control information is aware of the structure of the frame.

A description will first be made of a subframe configuration in which one of the two frequency bands is used to deliver the subframe of one link and the other frequency band is used to deliver the subframe of the other links.

Figure 2:
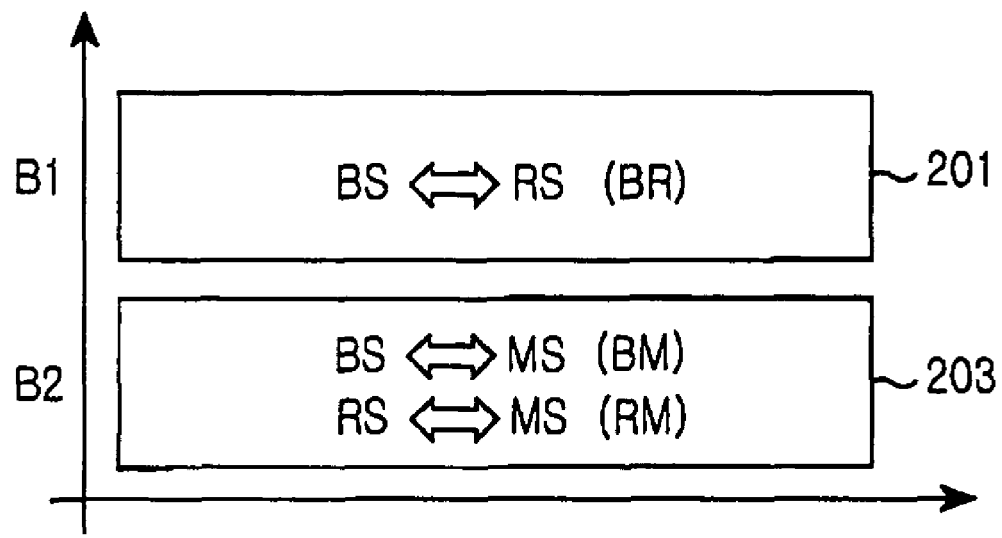
FIG. 2 illustrates a subframe configuration in the multi-hop relay cellular network according to the present invention.

FIG. 2 shows a subframe configuration in a multi-hop relay cellular network according to the present invention. Subframes are configured for different links in a B1 band 201 and a B2 band 203. A subframe is configured for a BS-RS link in the B1 band 201, and subframes are configured for a BS-MS link and an RS-MS link in the B2 band 203.

According to this subframe configuration, the BS-RS link is separated from the BS-MS link and communications are conducted simultaneously on the links. Thus BS manages different frequency band for RSs and MSs, simultaneously.

The RS has the RS-MS link and the BS-RS link in the different frequency bands and communications occur simultaneously on the links. Therefore, the RS also may need two transmitters/receivers. However, transmission/reception does not occur simultaneously in the two frequency bands. For example, in downlink subframes, the RS receives a signal from the BS in the B1 band 201 and sends a signal to the MS in the B2 band 203. In uplink subframes, the RS sends a signal to the BS in the B1 band 201, and receives a signal from the MS in the B2 band 203.

Accordingly, the RS can establish the communications links in the two frequency bands using one transmitter/receiver.

Furthermore, since subframes are sent independently on the BS-RS link and the RS-MS link in the different frequency bands, the RS needs no transition gap for operation switching between uni-directional links.

As to the MS, the BS-MS link and the RS-MS link are in the same frequency band. Therefore, intra-cell handoff and cell search are facilitated without Radio Frequency (RF) switching for the intra-cell handoff. Due to the use of the same frequency band for the two links, the MS has to identify the BS and the RS. The identification can be done by use of different preamble structures and configuration schemes.

In FIG. 2, because the BS-MS and RS-MS links, and the BS-RS link occupy the different frequency bands, an advanced technology such as a smart antenna, Multi-Input Multi-Output (MIMP), Vertical Bell Labs Layered Space-Time (VBLAST), etc., can be applied easily to the BS-RS link in order to provide a better link condition.

Figure 3:
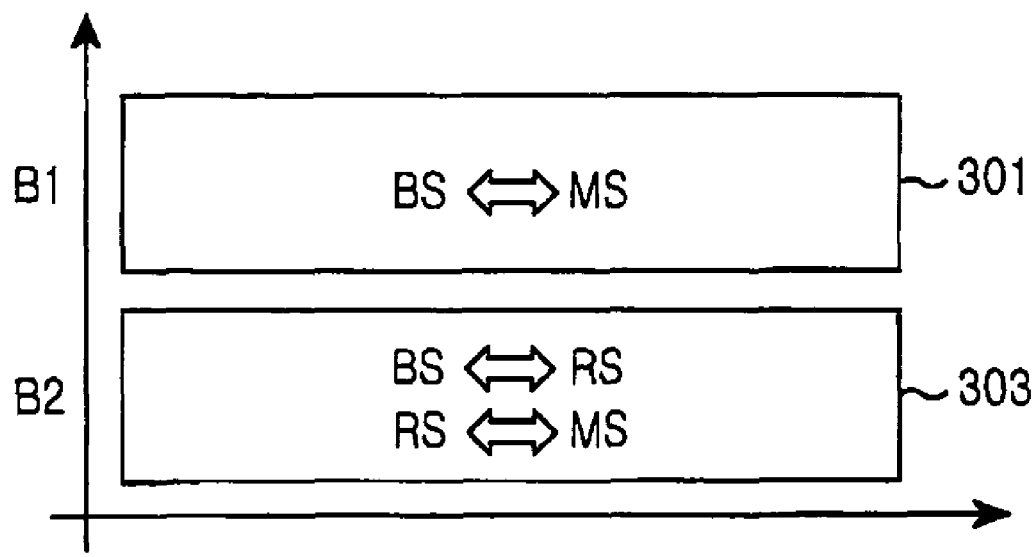
FIG. 3 illustrates a subframe configuration in the multi-hop relay cellular network according to another embodiment of the present invention.

FIG. 3 shows another example of a subframe configuration in the multi-hop relay cellular network according to the present invention. Subframes are configured for different links in a B1 band 301 and a B2 band 303. A subframe is configured for a BS-MS link in the B1 band 301, and subframes are configured for a BS-RS link and an RS-MS link in the B2 band 303. The subframe for MS with a direct link service and the subframe for MS with a relay service are in different frequency bands and thus they are not overlapped.

In this subframe configuration, the BS-RS link is separated from the BS-MS link and communications are conducted simultaneously on the links. Thus BS manages different frequency band for RSs and MSs, simultaneously.

The RS has the RS-MS link and the BS-RS link in the same frequency band. Therefore, a transition gap is needed between uni-directional links, for operation switching.

As to the MS, the BS-MS link and the RS-MS link differ in frequency band. Therefore, when the MS moves between the BS and the RS within a cell, the MS has to receive signals in the different frequency bands, for handoff and cell search. As a consequence, the MS needs RF switching for switching between the frequency bands.

Figure 4:
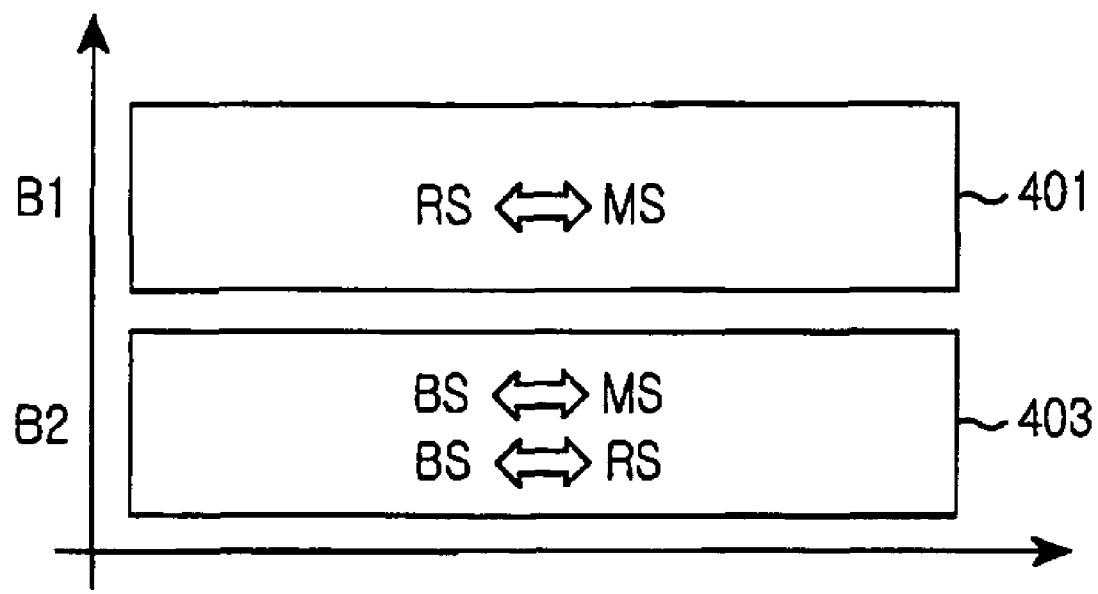
FIG. 4 illustrates a subframe configuration in the multi-hop relay cellular network according to a third embodiment of the present invention.

FIG. 4 shows another example of a subframe configuration in the multi-hop relay cellular network according to the present invention. Subframes are configured for different links in a B1 band 401 and a B2 band 403. A subframe is configured for a relay link, i.e. an RS-MS link in the B1 band 401, and subframes are configured for direct links, a BS-RS link and a BS-MS link in the B2 band 403.

According to this subframe configuration, since the BS communicates on the BS_MS link and the BS_RS link in one frequency band, the BS can consider no additional features for RS.

The RS has the RS-MS link and the BS-RS link in the different frequency bands and thus may need two transmitters/receivers. However, transmission/reception does not occur simultaneously in the two frequency bands. For example, in downlink subframes, the RS sends a signal to the MS in the B1 band 401 and receives a signal from the BS in the B2 band 403. In uplink subframes, the RS receives a signal from the MS in the B1 band 401 and sends a signal to the BS in the B1 band 403.

Accordingly, the RS can establish the communications links in the two frequency bands using one transmitter/receiver.

Furthermore, since subframes are sent independently on the BS-RS link and the RS-MS link in the different frequency bands, the RS needs no transition gap for operation switching between uni-directional links.

As to the MS, the BS-MS link and the RS-MS link are in the different frequency bands. Therefore, when the MS moves between the BS and the RS within a cell, it has to receive signals in the different frequency bands, for handoff and cell search. As a consequence, the MS needs RF switching for switching between the frequency bands.

Now a description will be made of configuring subframes for two links in each frequency band.

Figure 5:
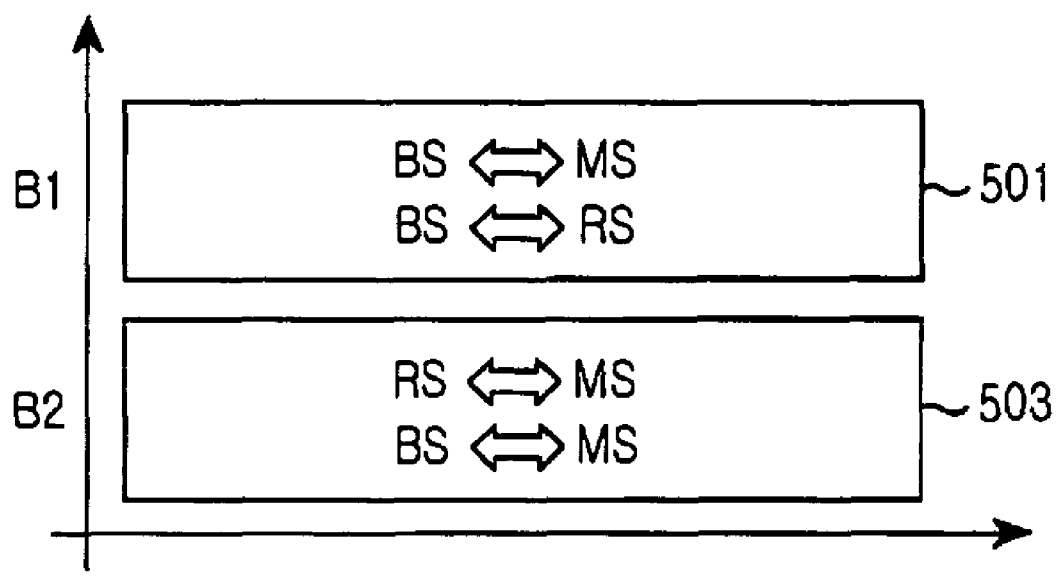
FIG. 5 illustrates a subframe configuration in the multi-hop relay cellular network according to a fourth embodiment of the present invention.

FIG. 5 shows another example of a subframe configuration in the multi-hop relay cellular network according to the present invention. Subframes are configured for different links in a B1 band 501 and a B2 band 503. Subframes are configured for a BS-MS link and a BS-RS link in the B1 band 501, for communications with the BS, and subframes are configured for the BS-MS link and an RS-MS link in the B2 band 503, for communications with the MS.

According to this subframe configuration, the BS-MS link uses the two frequency bands, and the BS-RS link and the BS-MS link are in the different frequency bands. Thus the BS uses two transmitters/receivers for the frequency bands.

The RS has the RS-MS link and the BS-RS link in the different frequency bands and thus may need two transmitters/receivers. However, transmission/reception does not occur simultaneously in the frequency bands. For example, in downlink subframes, the RS receives a signal from the BS in the B1 band 501 and sends a signal to the MS in the B2 band 503. In uplink subframes, the RS sends a signal to the BS in the B1 band 501, and receives a signal from the MS in the B2 band 503.

Accordingly, the RS can establish the communications links in the two frequency bands using one transmitter/receiver.

Furthermore, since subframes are sent independently on the BS-RS link and the RS-MS link in the different frequency bands, the RS needs no transition gap for operation switching between uni-directional links.

Since the MS communicates on the BS-MS link and the RS-MS link in the B2 band 503, intra-cell handoff and cell search are facilitated without RF switching for the intra-cell handoff. Due to the use of the same frequency band for the two links, the MS has to identify the BS and the RS. The identification can be done by use of different preamble structures and configuration schemes.

Figure 6:
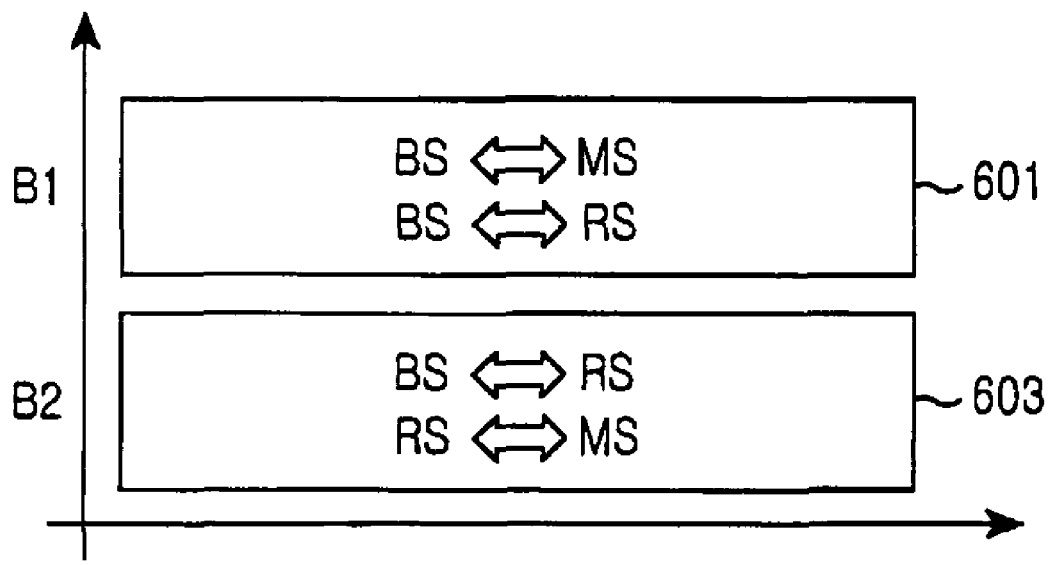
FIG. 6 illustrates a subframe configuration in the multi-hop relay cellular network according to a fifth embodiment of the present invention.

FIG. 6 shows another example of a subframe configuration in the multi-hop relay cellular network according to the present invention. Subframes are configured for different links in a B1 band 601 and a B2 band 603. Subframes are configured for a BS-MS link and a BS-RS link in the B1 band 601, for communications with the BS, and subframes are configured for the RS-MS link and a BS-RS link in the B2 band 603, for communications with the RS.

According to this subframe configuration, since the BS-RS link uses the two frequency bands, and the BS-RS link and the BS-MS link are in the different frequency bands, the BS uses two transmitters/receivers for the frequency bands.

The RS also needs two transmitters/receivers because the BS-RS link is established in the two frequency bands. A transition gap is needed for operation switching between uni-directional links since the subframes of the BS-RS link and the RS-MS link are configured in one frequency band.

As to the MS, it communicates on the BS-MS link and the RS-MS link in the different frequency bands. Therefore, when the MS moves between the BS and the RS within the same cell, the MS has to receive signals in the different frequency bands, for handoff and cell search. As a consequence, the MS needs RF switching for switching between the frequency bands.

Figure 7:
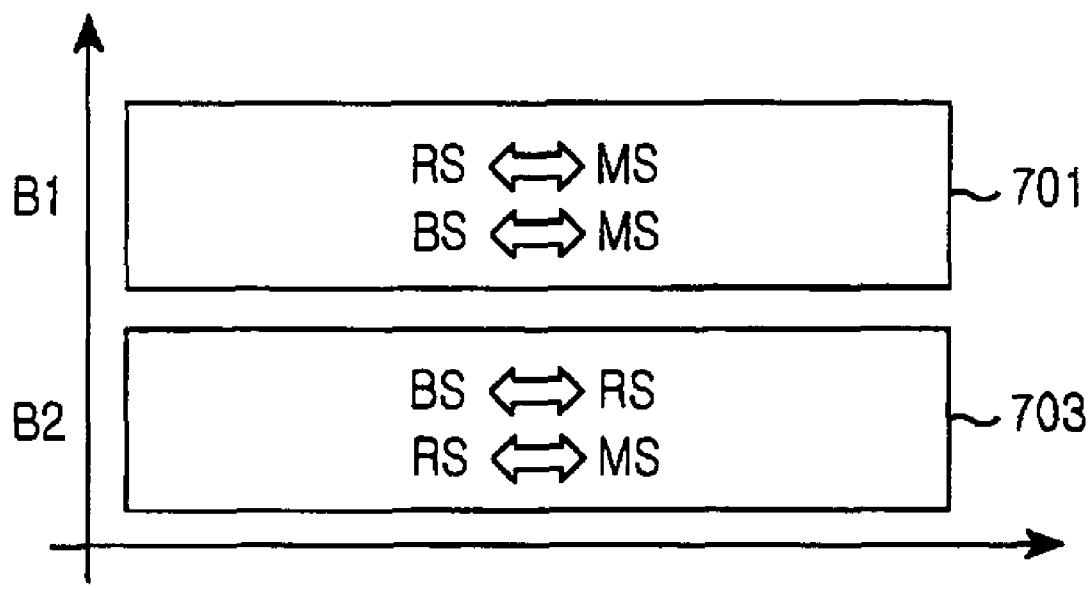
FIG. 7 illustrates a subframe configuration in the multi-hop relay cellular network according to a sixth embodiment of the present invention.

FIG. 7 shows another example of a subframe configuration in the multi-hop relay cellular network according to the present invention. Subframes are configured for different links in a B1 band 701 and a B2 band 703. Subframes are configured for an RS-MS link and a BS-MS link in the B1 band 701, for communications with the MS, and subframes are configured for the RS-MS link and a BS-RS link in the B2 band 703, for communications with the RS.

According to this subframe configuration, since the BS communicates on the BS-RS link and the BS-MS link in the different frequency bands, it uses two transmitters/receivers for the frequency bands.

The RS also needs two transmitters/receivers because the RS-MS link is established in the two frequency bands. A transition gap is needed for operation switching between uni-directional links since the subframes of the BS-RS link and the RS-MS link are configured in one frequency band.

As to the MS, since it communicates on the BS-MS link and the RS-MS link in the B1 band 701, the MS has to identify the BS and the RS. The identification can be done by use of different preamble structures and configuration schemes.

The MS communicates on the BS-MS link and the RS-MS link in the different frequency bands. Thus when the MS moves between the BS and the RS within a cell, the MS has to receive signals in the different frequency bands, for handoff and cell search. As a consequence, the MS needs RF switching for switching between the frequency bands.

In the above-described subframe configurations, when subframes are configured so subframes for two links exist in one frequency band, one of the subframes may exist in the frequency band.

Figure 8:
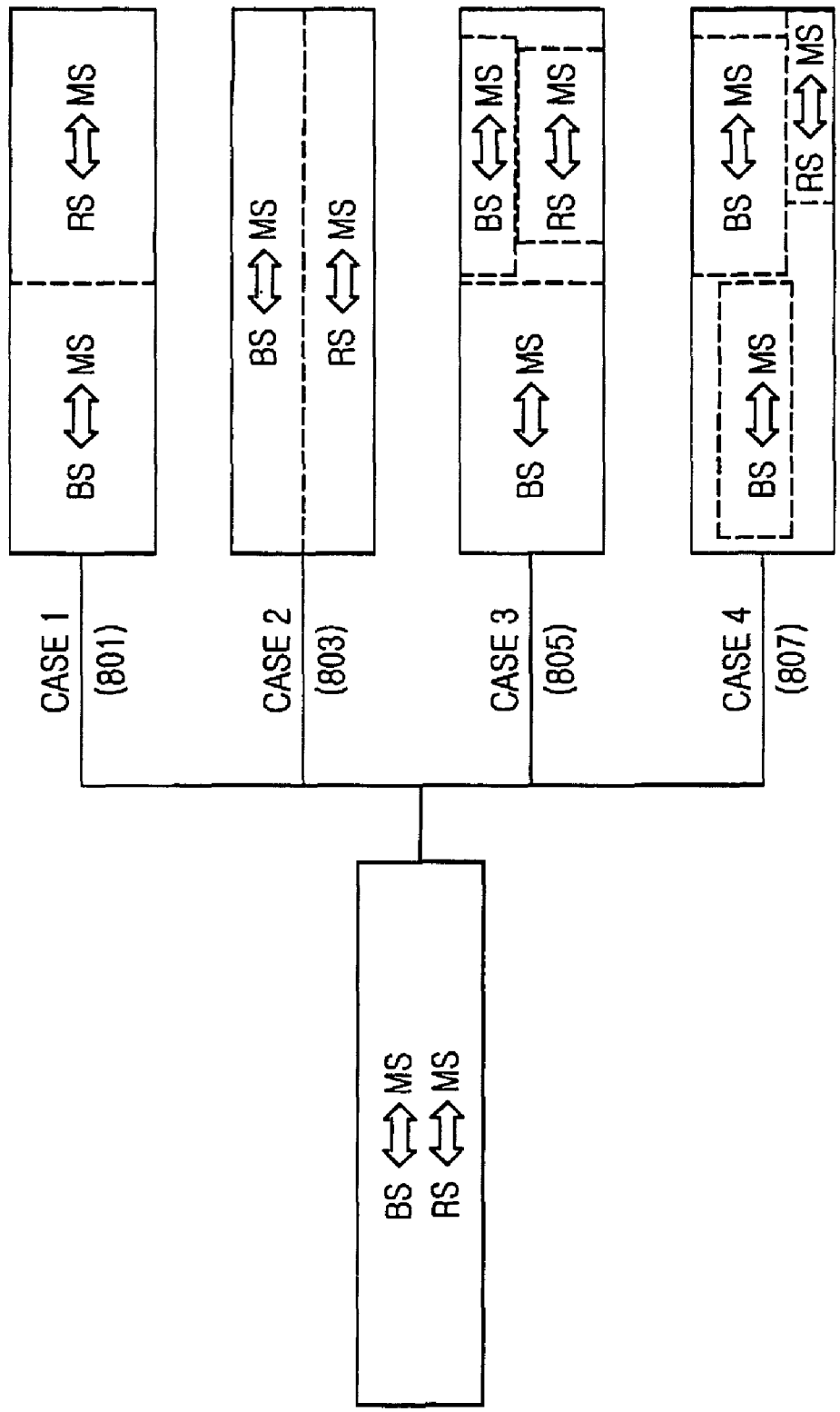
FIG. 8 illustrates a subframe multiplexing method according to the present invention.

FIG. 8 shows a subframe multiplexing method according to the present invention. A dotted line implies that an allocated area can be dynamically changed under circumstances. The resources of the subframe of each link are allocated to two-dimensional (time-frequency) bursts for a plurality of transmitters.

Referring to FIG. 8, configuring subframes for a BS-MS link and an RS-MS link in one of two frequency bands are considered in four ways.

One way 801 (Case 1) is that the BS-MS link subframe and the RS-MS link subframe are allocated to different time slots by time multiplexing. In this case, the burst allocation freedom of one link is high with respect to the other link. That is, a different resource allocation scheme can be applied to each link.

Another way 803 (Case 2) is that the BS-MS link subframe and the RS-MS link subframe are allocated to different frequency bands by frequency multiplexing. In this case, a narrow-band operation gain can be achieved by allocating a time-sensitive burst to the RS-MS link for a plurality of RSs. When a narrow band is occupied by sending a signal with constant transmit power in the time domain even though the bandwidth of an occupied frequency band is changed, a receiver can achieve a higher Signal-to-Interference and Noise Ratio (SINR) in the frequency domain, thus improving link budget. This is called the narrow-band operation gain.

A third way 805 (Case 3) is that an area with the BS-MS link subframe only is multiplexed with an area with different bursts allocated to the BS-MS link subframe and the RS-MS link subframe.

The other way 807 (Case 4) is that different bursts are allocated to the BS-MS link subframes and the RS-MS link subframe. In this case, to distinguish the burst allocations of the different links from one another, the same burst configuration scheme must be used during resource allocations.

Figure 9:
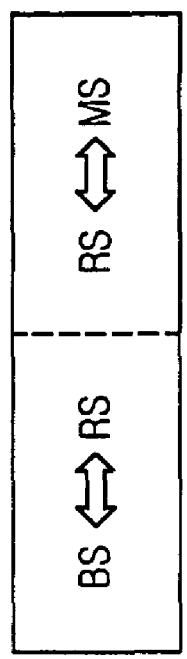
FIG. 9 illustrates a subframe multiplexing method according to another embodiment of the present invention.
Figure 9:
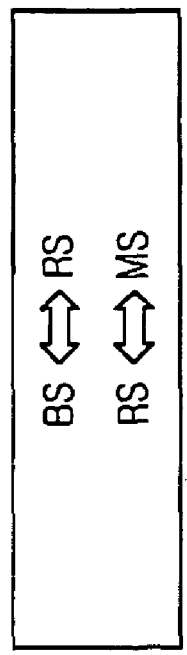

FIG. 9 shows another example of a subframe multiplexing method according to the present invention. A dotted line implies that an allocated area can be dynamically changed under circumstances. The resources of the subframe of each link are allocated to two-dimensional (time-frequency) bursts.

Referring to FIG. 9, a BS-RS link subframe and an RS-MS link subframe are configured in one of two frequency bands.

For the RS to carry out transmission and reception simultaneously in frequency band, the BS-RS link subframe and the RS-MS link subframe are allocated to different time slots by Time Division Multiplexing (TDM). A transition gap is needed between the unidirectional links, for operation switching of the RS.

Figure 10:
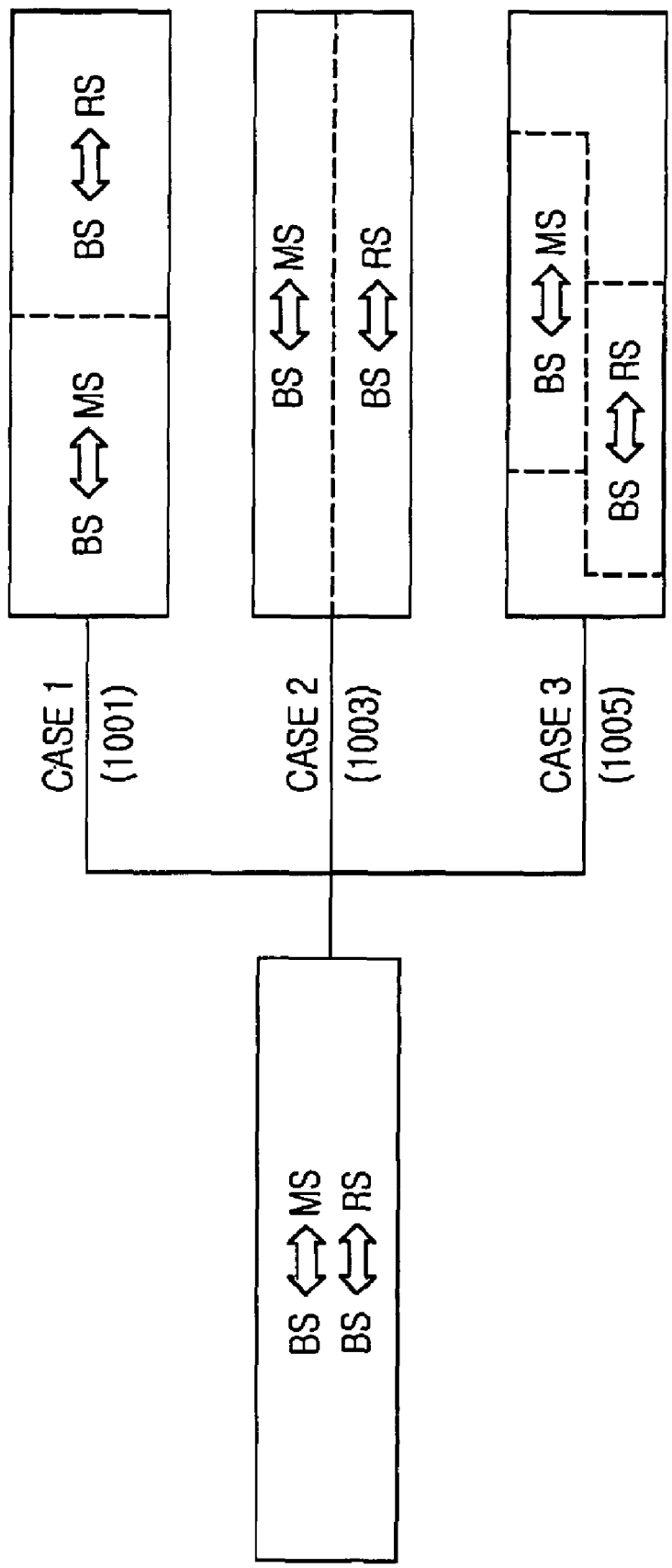
FIG. 10 illustrates a subframe multiplexing method according to a third embodiment of the present invention.

FIG. 10 shows another example of a subframe multiplexing method according to the present invention. A dotted line implies that an allocated area can be dynamically changed under circumstances. The resources of the subframe of each link are allocated to a two-dimensional (time-frequency) burst.

Referring to FIG. 10, configuring subframes for a BS-MS link and a BS-RS link in one of two frequency bands are considered in three ways.

One way 1001 (Case 1) is that the BS-MS link subframe and the BS-RS link subframe are allocated to different time slots by time multiplexing. Since the BS-RS link can be established independently of the BS-MS link, an advanced technology that offers a better link condition can be applied easily to the BS-RS link.

Another way 1003 (Case 2) is that the BS-MS link subframe and the BS-RS link subframe are allocated to different frequency bands by frequency multiplexing.

The other way 1005 (Case 3) is that different bursts are allocated to the BS-MS link subframe and the BS-RS link subframe. In this case, the BS can carry out transmission/reception on the two links simultaneously, thereby reducing the overhead of common broadcast information.

Figure 11:
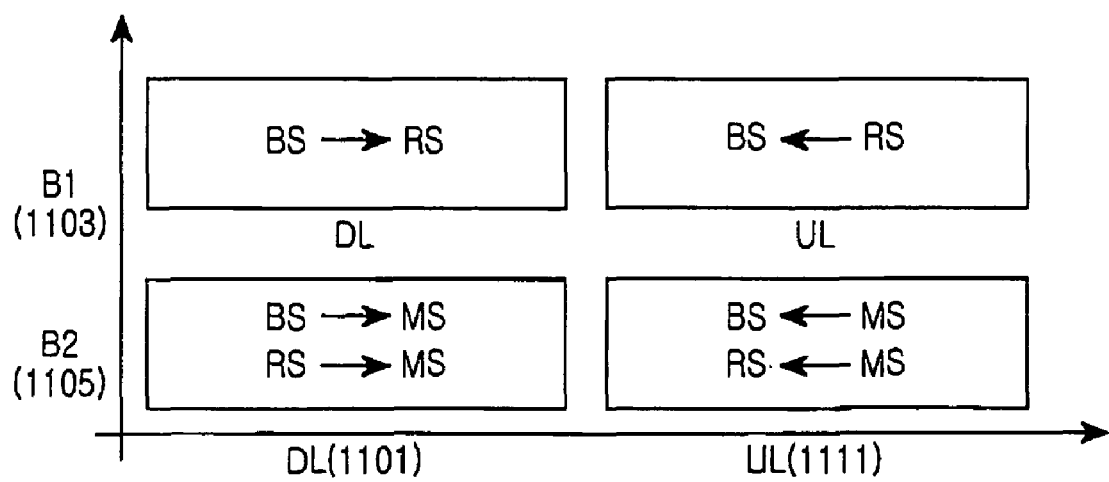
FIG. 11 illustrates a frame configuration in the multi-hop relay cellular network according to the present invention.

FIG. 11 shows a frame configuration in the multi-hop relay cellular network according to the present invention. Referring to FIG. 11, the frame is so configured in a TDD frame structure as to include downlink subframes 1101 and uplink subframes 1103 configured as shown in FIG. 2.

The downlink subframes 1101 is composed of a BS-RS link subframe in a B1 band 1103, and a BS-MS link subframe and an RS-MS link subframe in a B2 band 1105, for communications with the MS. Since the BS-MS and RS-MS links and the BS-RS link use different frequency bands, an advanced technology that offers a better link condition can be easily applied to the BS-RS link.

The BS uses two transmitters/receivers for the two frequency bands because the BS-RS link and the BS-MS link are established in the different frequency bands.

As to the RS, the RS-MS link and the BS-RS link are established in the different frequency bands and the RS may also need two transmitters/receivers. However, on the downlink 1101, the RS receives a signal from the BS in the B1 band 1103 and sends a signal to the MS in the B2 band 1105. On the uplink 1111, the RS sends a signal to the BS in the B1 band 1103 and receives a signal from the MS in the B2 band 1105. Hence, the RS can establish the communication links in the two frequency bands with a single transmitter/receiver.

Furthermore, since the BS-RS link subframe and the RS-MS link subframe are sent independently in the different frequency bands, the RS needs no transition gap for operation switching between the uni-directional links.

As to the MS, it communicates with the BS and the RS in the same frequency band. Hence, handoff and cell search can be implemented without RF switching in the cell.

Figure 12:
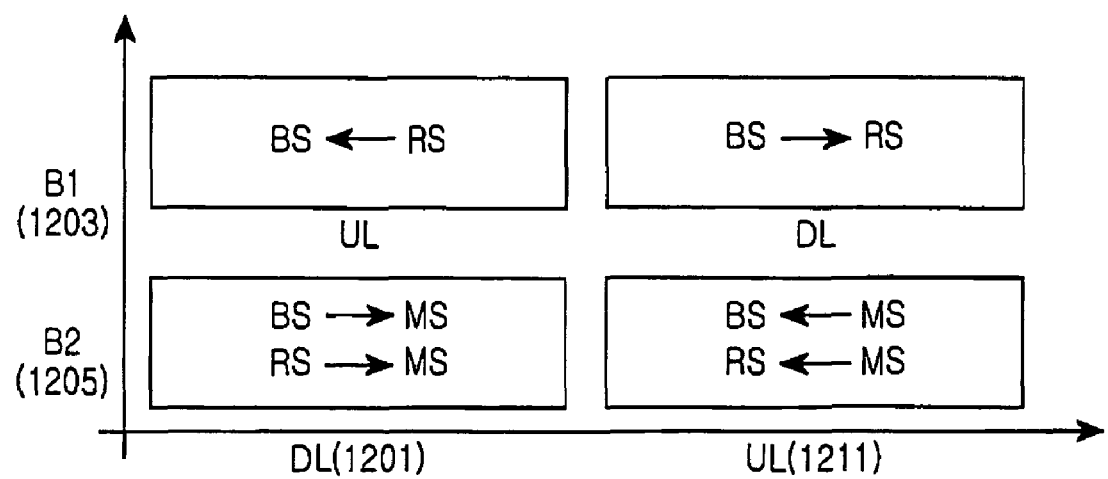
FIG. 12 illustrates a frame configuration in the multi-hop relay cellular network according to another embodiment of the present invention.

FIG. 12 shows another example of a frame configuration in the multi-hop relay cellular network according to the present invention. The frame includes downlink subframes and uplink subframes configured as illustrated in FIG. 2. Each of two frequency bands is switched between the downlink and the uplink in time. That is, at a given time, an uplink subframe is configured in one of the two frequency bands and a downlink subframe is configured in the other frequency band.

In a first time slot 1201, the BS receives a signal from the RS on the BS-RS link in a B1 band 1203 and sends a signal to the MS on the BS-MS link in a B2 band 1205. In a second time slot 1211, the BS sends a signal to the RS in the B1 band 1203 and receives a signal from the MS on the BS-MS link in the B2 band 1205. Therefore, the BS can establish the communication links in the two frequency bands with a single transmitter/receiver.

From the BS's point of view, each of the frequency bands in the frame is operated in a TDD manner, and the frequency bands in each time interval are operated in a Frequency Division Duplex (FDD)-like manner.

Besides the frame configurations shown in FIGS. 11 and 12, various TDD frame structures can be designed based on the subframe configurations shown in FIGS. 2 to 7. While it has been described that the multi-hop cellular network uses two frequency bands, more frequency bands are also available.

The configurations of the BS, the RS, and the MS for supporting a relay service in the multi-hop relay cellular network using two frequency bands will be described below. Since the BS and the RS are identical in structure, the BS as well as the RS will be described with reference to FIGS. 13, 14 and 15. The MS is so configured as to be identical to a transmitter and receiver for communicating in one of the two frequency bands.

Figure 13:
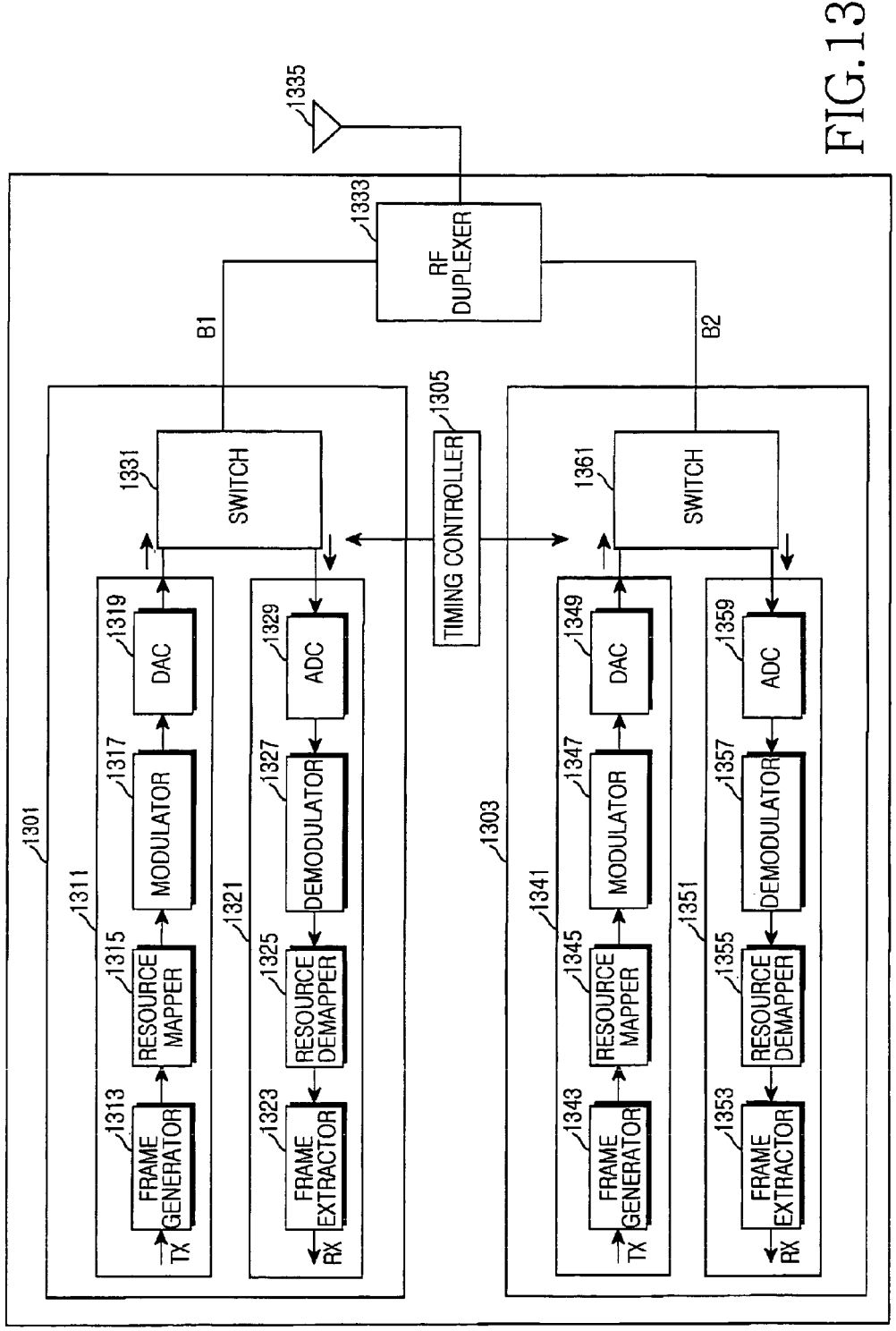
FIG. 13 is a block diagram of an RS according to the present invention.

FIG. 13 shows an RS according to the present invention. The RS includes a B1 band transceiver 1301, a B2 band transceiver 1303, a timing controller 1305, and an RF duplexer 1333. The B1 band transceiver 1301 and the B2 band transceiver 1303 are identical in configuration and the B1 band transceiver 1301 will be described by way of example.

The RF duplexer 1333 separately provides RF signals received through an antenna to the transceivers 1301 and 1303 according to their frequency bands.

The B1 band transceiver 1301 is comprised of a transmitter 1311 for sending a signal in a B1 band, a receiver 1321 for receiving a signal in the B1 band, and an RF switch 1331.

The transmitter 1311 includes a frame generator 1313, a resource mapper 1315, a modulator 1317, a Digital-to-Analog Converter (DAC) 1319.

The frame generator 1313 generates subframes with data received from an upper end according to their destinations. For example, the frame generator 1313 configures an RS-MS link subframe with data to be sent to the MS connected to the RS, and a BS-RS subframe with data to be sent to the BS in one of the subframe configuration methods shown in FIGS. 2 to 7.

If the frame generator 1313 is included in the BS, it generates a BS-MS subframe with data to be sent to the MS connected to the BS by a direct link and a BS-RS link subframe with data to be sent to the RS according to a predetermined subframe configuration method. If the fame configurer 1313 is included in the MS, it generates a BS-MS link subframe when the BS is connected to the MS by the direct link, and an RS-MS link subframe if the MS is connected to the RS.

The resource mapper 1315 maps the subframes received from the frame generator 1313 to bursts for the links allocated to the subframes.

The modulator 1317 modulates the mapped subframes in a predetermined modulation scheme.

The DAC 1319 converts the digital signal received from the modulator 1317 to an analog signal. After the analog signal is unconverted to an RF signal, the RF signal is sent in the B1 band through the RF switch 1331 and the RF duplexer 1333.

The receiver 1321 is comprised of an Analog-to-Digital Converter (ADC) 1323, a demodulator 1325, a resource demapper 1327, and a frame extractor 1329.

The ADC 1323 converts a B1 band signal, which is received through the RF duplexer 1333 and the RF switch 1331 and downconverted to a baseband signal, to a digital signal.

The demodulator 1325 demodulates the digital signal in a predetermined demodulation scheme.

The resource demapper 1327 extracts actual subframes from bursts of links received from the demodulator 1325.

The frame extractor 1329 extracts subframes for the receiver 1321 from the subframes received from the resource demapper 1327. For example, the frame extractor 1329 extracts an RS-MS link subframe and a BS-RS link subframe.

If the frame extractor 1329 is included in the BS, it extracts a BS-MS link subframe and a BS-RS link subframe. If the frame extractor 1329 is included in the MS, it extracts a BS-MS link subframe and an RS-MS link subframe.

The RF switch 1331 switches the transmitter 1311 and the receiver 1321 to the RF duplexer 1333 according to the transmission and reception bands of the frame under the control of the timing controller 1305.

The timing controller 1305 controls the transmission and reception timings of the B1 band and the B2 band in the frame.

Figure 14:
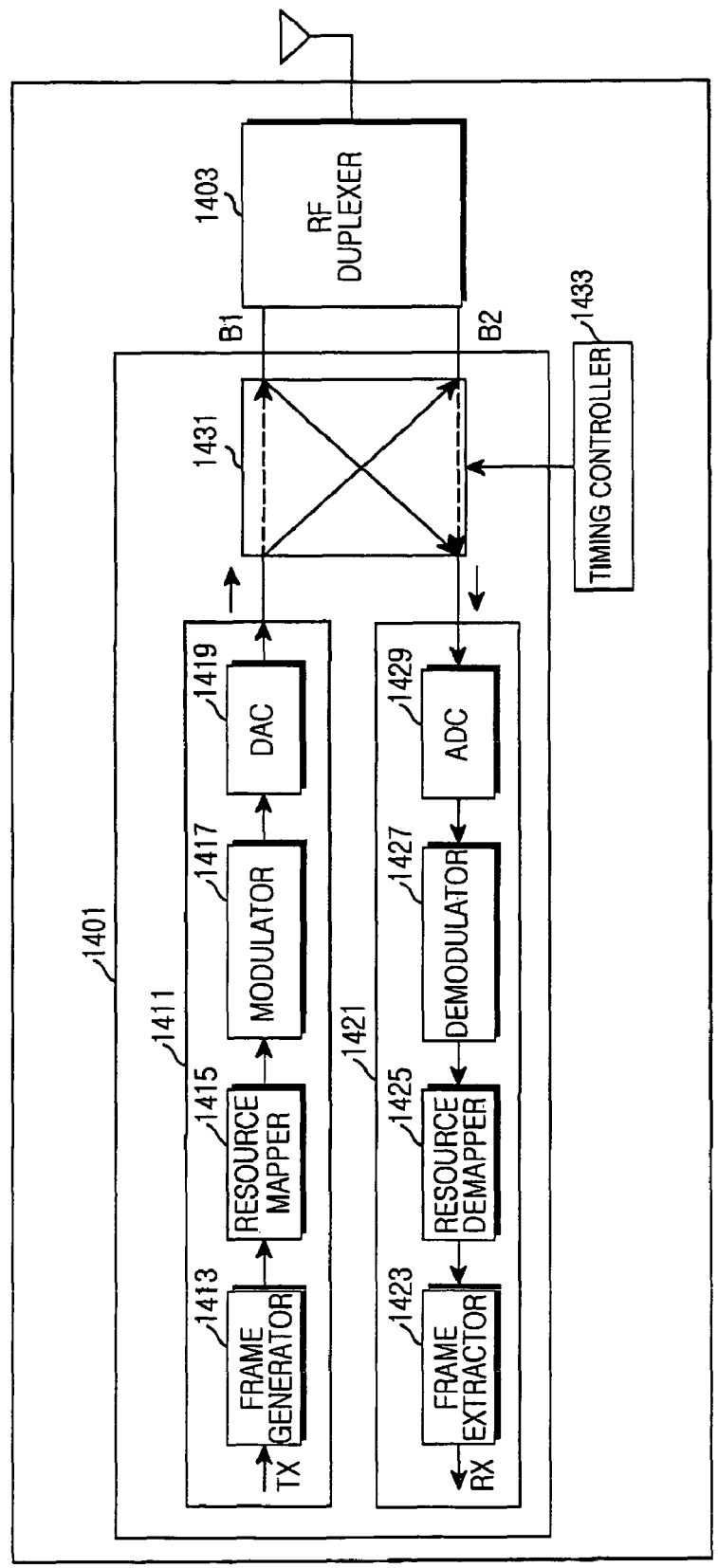
FIG. 14 is a block diagram of an RS according to another embodiment of the present invention.

FIG. 14 shows another example of an RS according to the present invention. Each module of the RS is identical to its corresponding module shown in FIG. 13 and thus will not be described herein. The RS includes an RF duplexer 1403 and a transceiver 1401. The transceiver 1401 sends/receives signals separately in the B1 band and the B2 band to/from an antenna through the RF duplexer 1403. The transceiver 1401 includes an RF switch 1431 for switching to a transmitter 1411 and a receiver 1421.

When an uplink subframe is configured in one frequency band and a downlink subframe is configured in the other frequency band in a given time slot, as shown in FIG. 12, signals can be sent/received in the two frequency bands B1 and B2 using a single transceiver under the control of the RF switch 1405.

Under the control of the RF switch 1405, the transmitter 1411 sends a B1 band signal and the receiver 1421 receives a B2 band signal in the first time slot. In the second time slot, the receiver 1421 receives a B1 band signal and the transmitter 1411 sends a B2 band signal.

The timing controller 1433 controls the RF switch 1431 by outputting transmission and reception timing signals for the B1 band and the B2 band.

Figure 15:
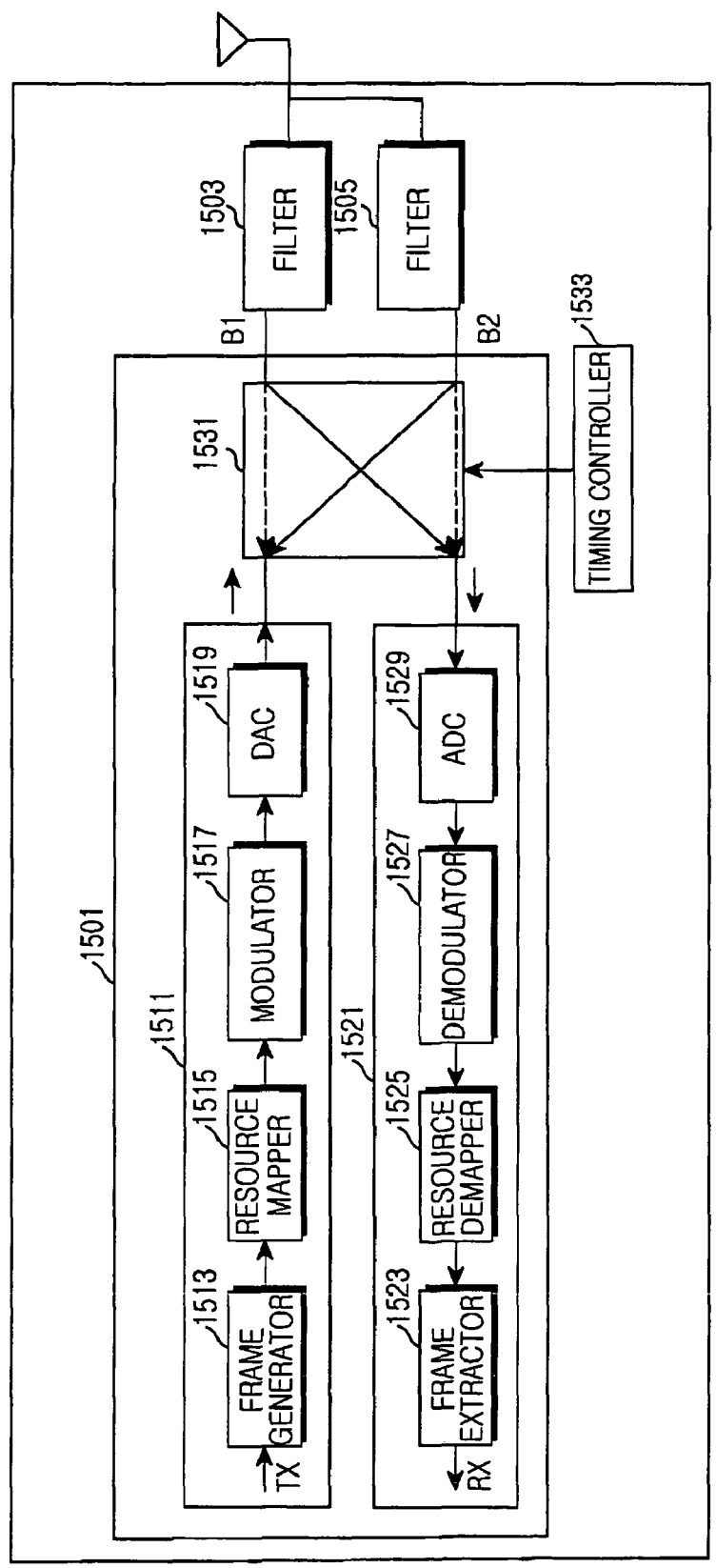
FIG. 15 is a block diagram of an RS according to a third embodiment of the present invention.

FIG. 15 shows another example of an RS according to the present invention. Each module of the RS is identical to its corresponding module shown in FIG. 13 and thus will not be described herein. Referring to FIG. 15, the RS includes an RF duplexer 1531, a transceiver 1501, and frequency band filters 1503 and 1505. The RF duplexer 1531 separates a B1 band signal and a B2 band signal to be sent through an antenna or received through the antenna from each other.

The RS is the same as the RS shown in FIG. 14 in that it sends/receives two frequency band signals using the transceiver 1501, but different from the RS shown in FIG. 14 in that it separates the two frequency bands from each other using the filters 1503 and 1505 and the RF duplexer 1531.

In accordance with the present invention as described above, a frame is so configured as to support multiple links in two frequency bands in a multi-hop relay cellular network. Therefore, interference between subframes is avoided resource is flexibly utilized, MS handoff and cell search are facilitated, an advanced technology can be easily applied, and the overhead of a transition gap for RS operation switching is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A subframe configuration method for supporting multiple links in a network, comprising the steps of:
   configuring at least one of a subframe for a Base Station (BS)-Mobile Station (MS) link and a subframe for a BS-Relay Station (RS) link in a first frequency band of a downlink subframe;
   configuring at least one of a subframe for an RS-MS link and a subframe for the BS-MS link in a second frequency band of a downlink subframe;
   configuring at least one of a subframe for the BS-MS link and a subframe for the BS-RS link in the first frequency band of an uplink subframe; and
   configuring at least one of a subframe for the RS-MS link and a subframe for the BS-MS link in the second frequency band of the uplink subframe,
   wherein the RS demodulates a received signal and modulates data to be sent to a receiver, and the downlink subframe and the uplink subframe are distinguished by time resources.

2. The subframe configuration method of claim 1, wherein subframes for links included in each of the first and second frequency bands are distinguished by allocating at least one of different time resources, different frequency resources and different bursts to the subframes.

3. A subframe configuration method for supporting multiple links in a network, comprising the steps of
   configuring a subframe for a Base Station (BS)-Relay Station (RS) link in a first frequency band of a downlink subframe;
   configuring a subframe for at least one of a BS-Mobile Station (MS) link and an RS-MS link in a second frequency band of the downlink subframe;
   configuring a subframe for the BS-RS link in the first frequency band of an uplink subframe; and
   configuring a subframe for at least one of the BS-MS link and the RS-MS link in the second frequency band of the uplink subframe,
   wherein the RS demodulates a received signal and modulates data to be sent to a receiver, and the downlink subframe and the uplink subframe are distinguished by time resources.

4. The subframe configuration method of claim 3, wherein the subframe for the BS-MS link and the subframe for the RS-MS link in the second frequency band are distinguished by allocating at least one of different time resources, different frequency resources and different bursts to the subframes.

5. A subframe configuration method for supporting multiple links in a network, comprising the steps of:
   configuring a subframe for a Base Station (BS)-Mobile Station (MS) link for providing a direct link service in a first frequency band of a downlink subframe;
   configuring at least one of a subframe for a BS-Relay Station (RS) link and a subframe for an RS-MS link, for providing a relay link service in a second frequency band of the downlink subframe;
   configuring a subframe for the BS-MS link for providing the direct link service in the first frequency band of an uplink subframe; and
   configuring at least one of a subframe for the BS-RS link and a subframe for the RS-MS link, for providing the relay link service in the second frequency band of the uplink subframe,
   wherein the RS demodulates a received signal and modulates data to be sent to a receiver, and the downlink subframe and the uplink subframe are distinguishable by time resources.

6. The subframe configuration method of claim 5, wherein the subframe for the BS-RS link and the subframe for the RS-MS link in the second frequency band are distinguished by allocating different time resources to the subframes.

7. A subframe configuration method for supporting multiple links in a network, comprising the steps of:
   configuring a subframe for a Relay Station (RS)-Mobile Station (MS) link in a first frequency band of a downlink subframe;
   configuring a subframe for at least one of a Base Station (BS)-RS link and a BS-MS link in a second frequency band of the downlink subframe;
   configuring a subframe for the RS-MS link in the first frequency band of an uplink subframe; and
   configuring a subframe for at least one of the BS-RS link and the BS-MS link in the second frequency band of the uplink subframe,
   wherein the RS demodulates a received signal and modulates data to be sent to a receiver, and the downlink subframe and the uplink subframe are distinguished by time resources.

8. The subframe configuration method of claim 7, wherein the subframe for the BS-MS link and the subframe for the BS-RS link in the second frequency band are distinguished by allocating at least one of different time resources, different frequency resource and different bursts to the subframes.

9. A subframe configuration method for supporting multiple links in a network, comprising the steps of:
   configuring at least one of a subframe for a Base Station (BS)-Mobile Station (MS) link and a subframe for a BS-Relay Station (RS) link in a first frequency band of a downlink subframe; and
   configuring at least one of a subframe for a BS-MS link and a subframe for the RS-MS link in a second frequency band of the downlink subframe;
   configuring at least one of a subframe for the BS-MS link and a subframe for the BS-RS link in the first frequency band of an uplink subframe; and
   configuring at least one of a subframe for the BS-MS link and a subframe for the RS-MS link in the second frequency band of the uplink subframe,
   wherein the RS demodulates a received signal and modulates data to be sent to a receiver, and the downlink subframe and the uplink subframe are distinguished by time resources.

10. The subframe configuration method of claim 9, wherein subframes for links included in each of the first and second frequency bands are distinguished by allocating at least one of different time resources, different frequency resources and different bursts to the subframes.

11. A subframe configuration method for supporting multiple links in a network, comprising the steps of:

configuring at least one of a subframe for an Relay Station (RS)-Mobile Station (MS) link and a subframe for a Base Station (BS)-MS link in a first frequency band of a downlink subframe; and configuring at least one of a subframe for a BS-RS link and a subframe for the RS-MS link in a second frequency band of the downlink subframe;

configuring at least one of a subframe for the RS-MS link and a subframe for the BS-MS link in the first frequency band of an uplink subframe; and configuring at least one of a subframe for the BS-RS link and a subframe for the RS-MS link in the second frequency band of the uplink subframe, wherein the RS demodulates a received signal and modulates data to be sent to a receiver, and the downlink subframe and the uplink subframe are distinguished by time resources.

12. The subframe configuration method of claim 11, wherein subframes for links included in each of the first and second frequency bands are distinguished by allocating at least one of different time resources, different frequency resources and different bursts to the subframes.

* * * * *